Patented Jan. 30, 1951

2,539,473

UNITED STATES PATENT OFFICE 2,539,473

PREPARATION OF N,N-DIETHYLLACTAMIDE

William P. Ratchford, Philadelphia, and Charles H. Fisher, Abington, Pa., assignors to the United States of America as represented by the Secretary of Agriculture No Drawing. Application November 15, 1949, Serial No. 127,502

5 Claims. (Cl. 260—561)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This application is a continuation-in-part of our copending application for patent, Serial No. 662,438, filed April 16, 1946, now U. S. Patent 2,494,583.

This invention relates to the preparation of N,N-dialkyllactamide. It particularly relates to the preparation of N,N-di-loweralkyl-lactamides, such as N,N-diethyllactamide.

As taught in the parent case, these lactamides are useful in the preparation of the corresponding acetoxy-propionamides. The latter are pyrolyzed to the corresponding N,N-dialkyl-acrylamides. The acrylamides can be employed in the arts, for example, in the preparation of co-polymeric resins with acylic acid and its esters, and with other acylamides.

In one aspect, the process involves reacting polylactic acid or alkyl esters thereof, with the dialkylamine, for instance, with diethylamine.

In one embodiment the polylactic acid is passed downwardly through a heated packed tower. The diethylamine vapors are passed upwardly in intimate contact with the downwardly flowing polylactic acid. The product is removed below.

The invention is illustrated by the following examples:

Example I 0.34 mole of N,N-diethyllactamide was prepared as follows: A mixture of polylactic acid, in amount equivalent to 1 mole of lactic acid, and the degree of polymerization of which was approximately 11, was refluxed with 1.1 mole diethylamine for 11 hours and heated in a sealed container on a steam bath for 32 hours. The mixture was then distilled. By allowing the distillation residue to react further with diethylamine, an additional quantity of N-diethyllactamide was obtained.

Example II

N,N-diethyllactamide was obtained also by passing polylactic acid and diethylamine countercurrently through a heated vertical tower (packed with small porcelain Berl saddles). In different experiments the tower was kept at 125°, 170°, and 173° to 179° C.

The methyl ester of polylactic acid also yielded N,N-diethyllactamide when treated with diethylamine.

Having thus described our invention, we claim:

1. A process of preparing N,N-diethyllactamide which comprises refluxing polylactic acid with diethylamine, the polylactic acid having a degree of polymerization of about 11.
2. A process of preparing N,N-diethyllactamide which comprises reacting polylactic acid with diethylamine.
3. A process of preparing N,N-diethyllactamide which comprises reacting diethylamine with a substance of the group consisting of polylactic acid and lower alkyl esters of polylactic acid, the polylactic acid having a degree of polymerization of about 11.
4. A process of preparing N,N-diethyllactamide which comprises reacting polylactic acid and diethyl-amine by passing them counter-currently through a heated reaction zone, the polylactic acid having a degree of polymerization of about 11.
5. A process of preparing N,N-diethyllactamide comprising passing polylactic acid, having a degree of polymerization of about 11, downwardly through a reaction zone while extensively distributed upon surfaces in intimate contact with diethylamine vapors passed countercurrently thereto, the lactamide being removed below, the temperature in the reaction zone being at about 125° to 179° C.

WILLIAM P. RATCHFORD.
CHARLES H. FISHER.

REFERENCES CITED

The following references are of record in the file of this patent:

UNITED STATES PATENTS

| Number | Name | Date |
|---|---|---|
| 1,986,854 | Reid | Jan. 8, 1935 |
| 2,286,738 | Hill | June 16, 1942 |
| 2,348,613 | De Groote et al. | May 9, 1944 |
| 2,429,877 | Gresham | Oct. 28, 1947 |
| 2,437,946 | Evans et al. | Mar. 16, 1948 |

OTHER REFERENCES

Wurtz et al.: "Annales de Chimie et de Physique," vol. 36, Series 3 (1861), pp. 108 to 110.

Bischoff et al.: "Liebigs Annalen," vol. 279 (1894), p. 94.

Freudenberg et al.: "Ber. deut. Chem.," vol. 63 (1930), pp. 2382 and 2389.